United States Patent
Schreiber

(10) Patent No.: US 8,183,909 B2
(45) Date of Patent: May 22, 2012

(54) METHOD FOR OPERATING A CONVERTER CIRCUIT WITH VOLTAGE BOOSTING

(75) Inventor: Dejan Schreiber, Nürnberg (DE)

(73) Assignee: Semikron Elektronik GmbH & Co. KG, Nürnburg (DE)

( * ) Notice: Subject to any disclaimer, the term of this patent is extended or adjusted under 35 U.S.C. 154(b) by 0 days.

(21) Appl. No.: 12/575,950

(22) Filed: Oct. 8, 2009

(65) Prior Publication Data

US 2010/0085106 A1 Apr. 8, 2010

(30) Foreign Application Priority Data

Oct. 8, 2008 (DE) .......................... 10 2008 042 693

(51) Int. Cl.
*H03K 17/725* (2006.01)
(52) U.S. Cl. ......... 327/447; 327/434; 327/448; 327/494
(58) Field of Classification Search .................... 327/92, 327/423–424, 494, 508, 587, 588; 363/17–19, 363/56.01–56.05, 68, 69, 98, 132, 136
See application file for complete search history.

(56) References Cited

U.S. PATENT DOCUMENTS

| | | | | |
|---|---|---|---|---|
| 5,343,079 | A | * | 8/1994 | Mohan et al. ................. 307/105 |
| 6,084,785 | A | * | 7/2000 | Kunisada et al. .............. 363/37 |
| 6,320,775 | B1 | * | 11/2001 | Ito et al. ....................... 363/132 |
| 6,567,283 | B2 | * | 5/2003 | Welches .......................... 363/89 |
| 6,750,633 | B2 | * | 6/2004 | Schreiber ........................ 322/12 |
| 6,879,053 | B1 | | 4/2005 | Welches |
| 6,924,629 | B1 | | 8/2005 | Mueller et al. |
| 7,646,165 | B2 | * | 1/2010 | Ueda et al. .................... 318/801 |
| 2002/0181258 | A1 | * | 12/2002 | Welches .......................... 363/89 |
| 2003/0155893 | A1 | * | 8/2003 | Schreiber ........................ 322/12 |
| 2008/0112200 | A1 | * | 5/2008 | Tan et al. ....................... 363/101 |
| 2010/0220499 | A1 | * | 9/2010 | Haj-Maharsi et al. .......... 363/13 |

FOREIGN PATENT DOCUMENTS

| | | |
|---|---|---|
| DE | 692 05 476 | 4/1996 |
| DE | 101 12 982 | 9/2002 |
| EP | 1 313 206 | 5/2003 |

* cited by examiner

*Primary Examiner* — Lincoln Donovan
*Assistant Examiner* — Brandon S Cole
(74) *Attorney, Agent, or Firm* — Roger S. Thompson

(57) ABSTRACT

Method for operating a converter circuit with voltage boosting with N half-bridges, which in each case can be connected by their center connection to a phase of an N-phase generator and at an end side are connected in parallel with a series circuit formed by two capacitances, wherein each half-bridge contains a Top switch and a Bot switch, in which, in a PWM method with a fixed period duration at the beginning of the period duration, all the TOP switches are simultaneously switched on for the duration of a TOP switched-on interval. After half the period duration all the BOT switches are simultaneously switched on for the duration of a BOT switched-on interval wherein the TOP switched-on interval, and the BOT switched-on interval amount at most to half the duration of the period.

16 Claims, 5 Drawing Sheets

METHOD FOR OPERATING A CONVERTER CIRCUIT WITH VOLTAGE BOOSTING

BACKGROUND OF THE INVENTION

1. Field of the Invention

The invention is directed to a method for operating a converter circuit with voltage boosting.

2. Description of the Related Art

Electrical three-phase generators serve for generating electrical energy that is generally fed into a supply voltage system. In the case of specific generators, e.g., in wind power installations dependent on the instantaneous wind conditions, their output speed, power or voltage can fluctuate, and is neither predictable nor controllable. Since the voltage supplied by the generator can thus lie below the voltage of the system to be fed, a boost converter (boost) circuit is often connected between generator and system. Particularly for generators having a center connection, so-called converter circuits are used which, relative to a center potential, generate a positive and negative voltage in a DC voltage intermediate circuit having two capacitors or capacitances connected in series, wherein the voltages of the respective capacitors can be set or regulated independently of one another. Imbalances in the supply voltage system or generator can thus be compensated for. For this purpose, each capacitor has an assigned boost converter circuit.

A circuit arrangement 500 on which the invention is based is known, e.g., from EP 1 313 206 B1 and shown in FIG. 4 (without connecting lines 11a, b—FIG. 3). The three phases P1 to P3 of a generator 502 are connected to an inverter 506 via an inductor block 504 or respectively via an inductor L1 to L3. In this case, the three phases P1 to P3 having a peak voltage $U_S$ are passed to a respective center connection 512a-c of three half-bridges 510a-c of the inverter 506. From each center connection, a Top switch 516a-c leads to a common Top connection 514 and a Bot switch 516a-c leads to a common Bot connection 515. In this case, each switch comprises an IGBT 520 with diode 522 reverse-connected in parallel.

An intermediate circuit 508 is connected between Top connection 514 and Bot connection 515, intermediate circuit 508 containing two series-connected capacitors 524a, b, the center connection 526 of which is connected to the center connection M of the generator 502.

By way of example, it is known from U.S. Pat. No. 6,567,283 B2 to insert between a diode rectifier and intermediate circuit 508 two series-connected Top and Bot IGBTs with freewheeling diodes, which are connected in parallel with the capacitors 524a, b via converter diodes lying in the Top and Bot connections 514, 515. The short-circuiting of the generator for boost purposes is thus transferred from the inverter into a separate boost branch.

In accordance with FIG. 5, a further circuit arrangement is known from U.S. Pat. No. 6,879,053. The phases $P_1$ to $P_3$ are in this case conducted to a diode rectifier 550 via an inductor block 504. The rectified voltage is then passed to a DC-DC converter 552, which charges capacitors 524a, b. The DC-DC converter 552 contains two step-up converters 554a, b, one each per series-connected capacitor 524a, b.

The driving of the known booster converters is relatively simple to implement since they act on the already rectified voltage and no longer have to be synchronized with the generator phases. However, with three switch half-bridges on three diode half-bridges and four switch half-bridges, the number of semiconductor modules required is considerable. This is because in practice fully equipped IGBT half-bridges with freewheeling diodes are in each case used for the series connection of a switch and the associated converter diode, wherein the IGBT connected in parallel with the converter diode remains unused.

SUMMARY OF THE INVENTION

It is an object of the present invention to specify a method for driving a converter circuit with voltage boosting and the smallest possible number of components.

The object is achieved by means of a method which involves operating a converter circuit with voltage boosting which has N half-bridges. The half-bridges in each case can be connected by their center connection to a phase of an N-phase generator. At an end side, the half-bridges are connected in parallel with a series circuit formed by two capacitances. Depending on the application, a center connection of the generator can additionally be connected to the center connection between the two capacitors. Each half-bridge contains a Top switch and a Bot switch.

A PWM method with a fixed period duration is carried out in accordance with the inventive method. At the beginning of the period duration, all the Top switches are simultaneously switched on for the duration of a Top switched-on interval. After half the period duration, all the Bot switches are simultaneously switched on for the duration of a Bot switched-on interval. In this case, the Top switched-on interval and the Bot switched-on interval are each less than or equal to half the period duration.

In this case, the PWM method according to the invention is not oriented towards the phase angle of the output voltages of the generator. The clock period of the PWM method is coupled to the output frequency of the generator only insofar as the PWM frequency should be significantly higher than the maximum output frequency, e.g., in the range of plural 10-fold, e.g., 60-fold.

Since in each case all the Top switches and all the Bot switches are simultaneously switched on and off, no particular synchronization or other precautions have to be implemented here either. The known circuit in accordance with FIG. 5 can therefore also be extended according to the invention by common control lines 11a, b (such as shown in FIG. 3) that respectively connect the inputs of all the Top and Bot switches.

The topology of the converter circuit remains simple and cost-effective since only N standard power semiconductor modules are required. The corresponding half-bridges are generally only equipped with the required components, such that the latter are fully utilized. The function of the coils in the inductor block in FIG. 5 is performed in this case by the windings of the generator.

The duration of the Top and Bot switched-on intervals are generally identical. The voltage charged onto the respective Top and Bot capacitors is then likewise identical in magnitude; the voltage of the center connection of the capacitors lies symmetrically between the end voltages.

In one preferred embodiment of the invention, the switched-on intervals of Top and Bot switches are chosen to have different lengths. This can also be realized in a particularly simple manner since no other synchronizations whatsoever are required between the Top or Bot switches of the individual phases. What is achieved as a result of this is that the two capacitors are charged to different voltage values. In other words, it is thus possible to shift the center voltage on the capacitors in the DC voltage intermediate circuit.

In a further preferred embodiment of the method, the generator has a constant or, in the case of fluctuations, maximum, operating frequency $f_B$. The period duration is then chosen as a fraction in the range of 1/10 or less, e.g., approximately 1/60 of the period duration of the operating frequency, that is say as 1/60 $f_B$. In other words, the switches are operated with a frequency more then 10 times, e.g., 60 times, the maximum operating frequency of the generator. It is thereby possible to achieve a particularly low residual ripple of the generated DC voltage on the capacitors since, through the superposition of the Top and Bot switched-on intervals with half the period duration, the resulting frequency doubles again.

The known conductor circuits can also be cascaded by connections K such circuits in parallel at the connections of the intermediate circuits, that is to say the end connections of the capacitor series circuits. In one preferred embodiment, the respective Top and Bot switches of the respective converter circuits are then switched on with a time offset of ½ K times the period duration.

In other words, e.g., in the case of a parallel connection of four converter circuits, in the first half of the period duration of the PWM method, at temporally identical spacings of one eighth of the period duration, all four Top switches of the four circuits are successively switched on for the duration of the switched-on intervals. In the second half of the period duration, all four Bot switches of the four boost circuits are then successively switched on, likewise with a time offset of one eighth of the period duration. The frequency of the residual ripple of the generated DC voltage thus rises again by the factor K.

In a further advantageous embodiment, each of the capacitors is charged to a voltage value of more than half the peak voltage of the generator. It is thereby possible to operate the circuit for voltage boosting with respect to the generator.

The driving of a converter circuit is greatly simplified by the method according to the invention. In the case of a more than three-phase, e.g., five-phase, generator system, the known fundamental advantages of polyphase systems arise, such as, e.g., a lower residual ripple of the output voltages. On account of the complexity of previous drive methods for converter circuits, however, polyphase systems were previously able to be utilized only with considerable outlay. By means of the method according to the invention, the use of converters for polyphase systems is practicable and can be utilized simply and, relatively, inexpensively. The number of phases in the system can therefore be chosen as desired without the control outlay for the converter circuit increasing.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

For a further description of the invention, reference is made to the exemplary embodiments in the drawings, in which, in each case in a basic schematic diagram.

DETAILED DESCRIPTION OF THE PRESENTLY PREFERRED EMBODIMENTS

Figure 1:
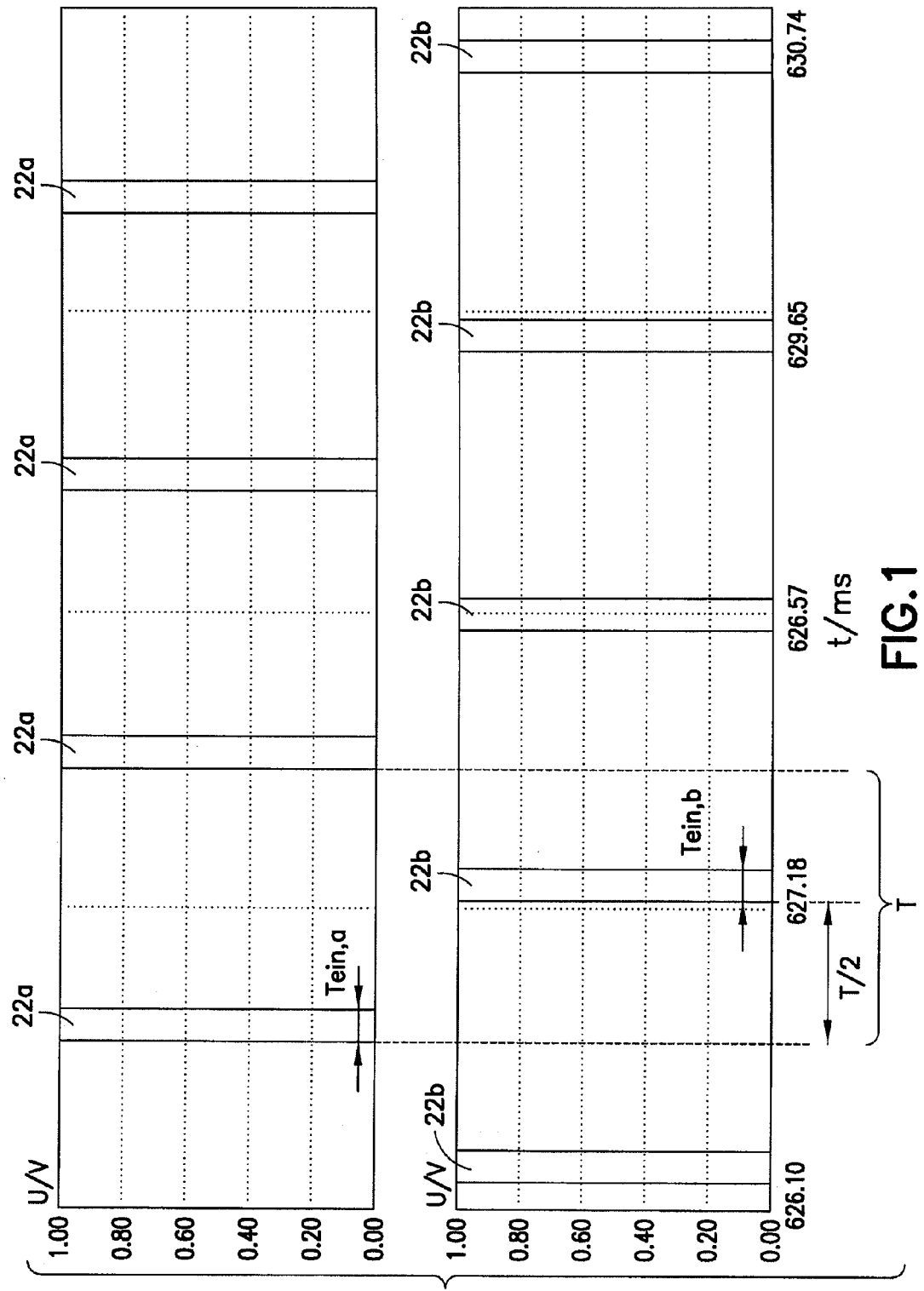
FIG. 1 shows the temporal profile of the PWM drive signals in the case of symmetrical driving of the known converter circuit shown in FIG. 5.
Figure 3:
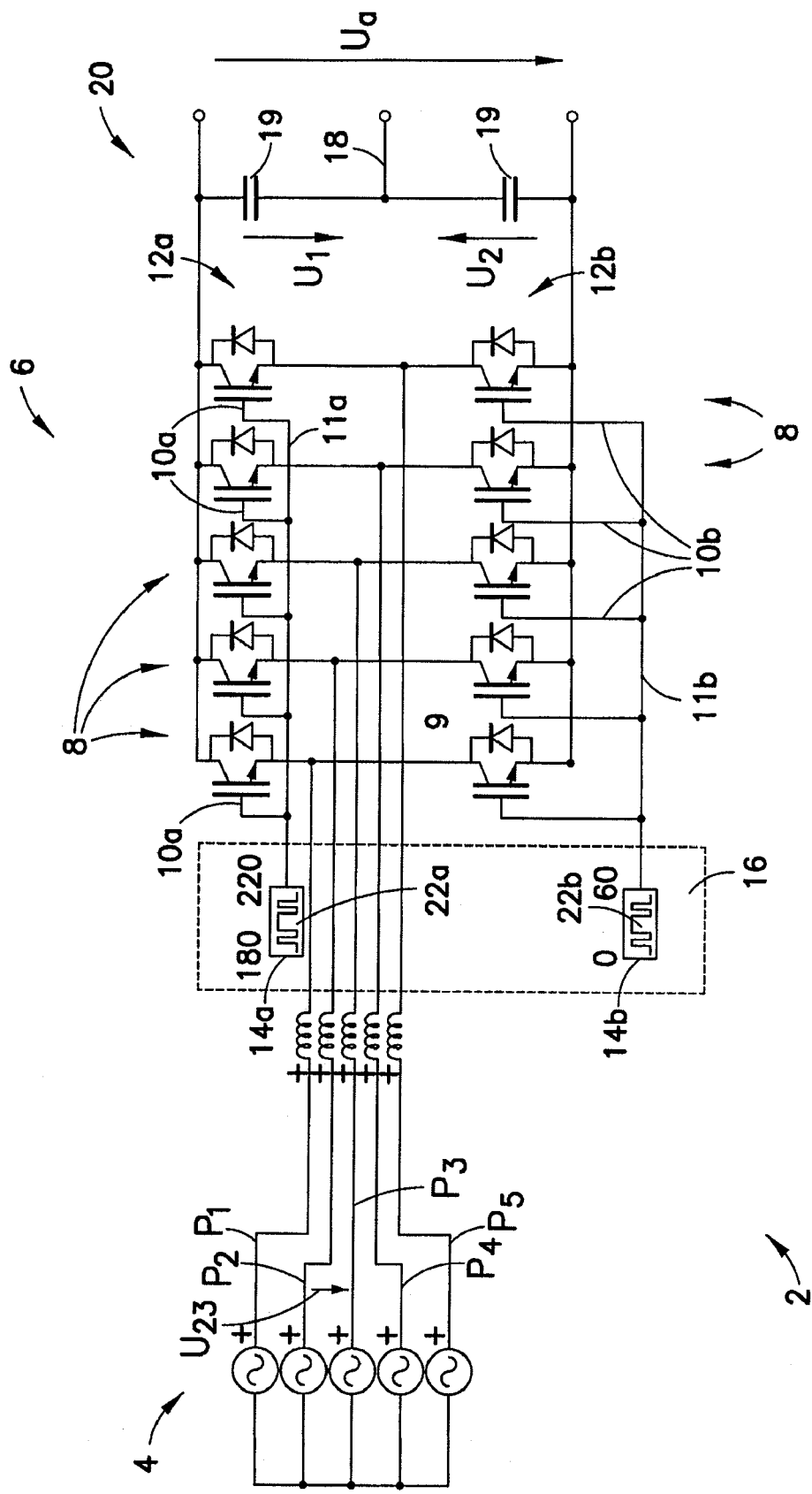
FIG. 3 shows a five-phase converter circuit operated by the method according to the invention.
Figure 4:
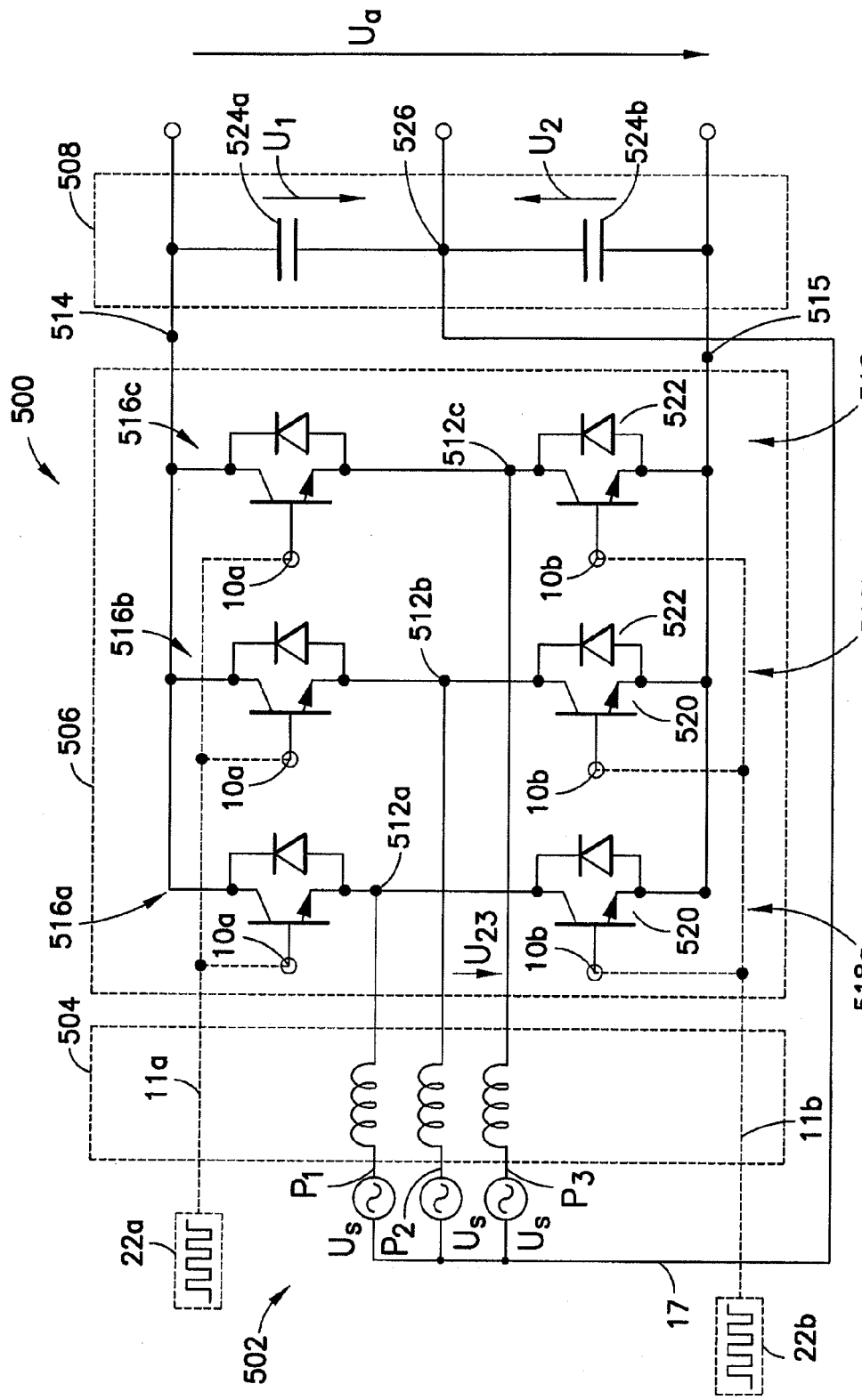
FIG. 4 shows a three-phase converter circuit in accordance with the prior art.
Figure 5:
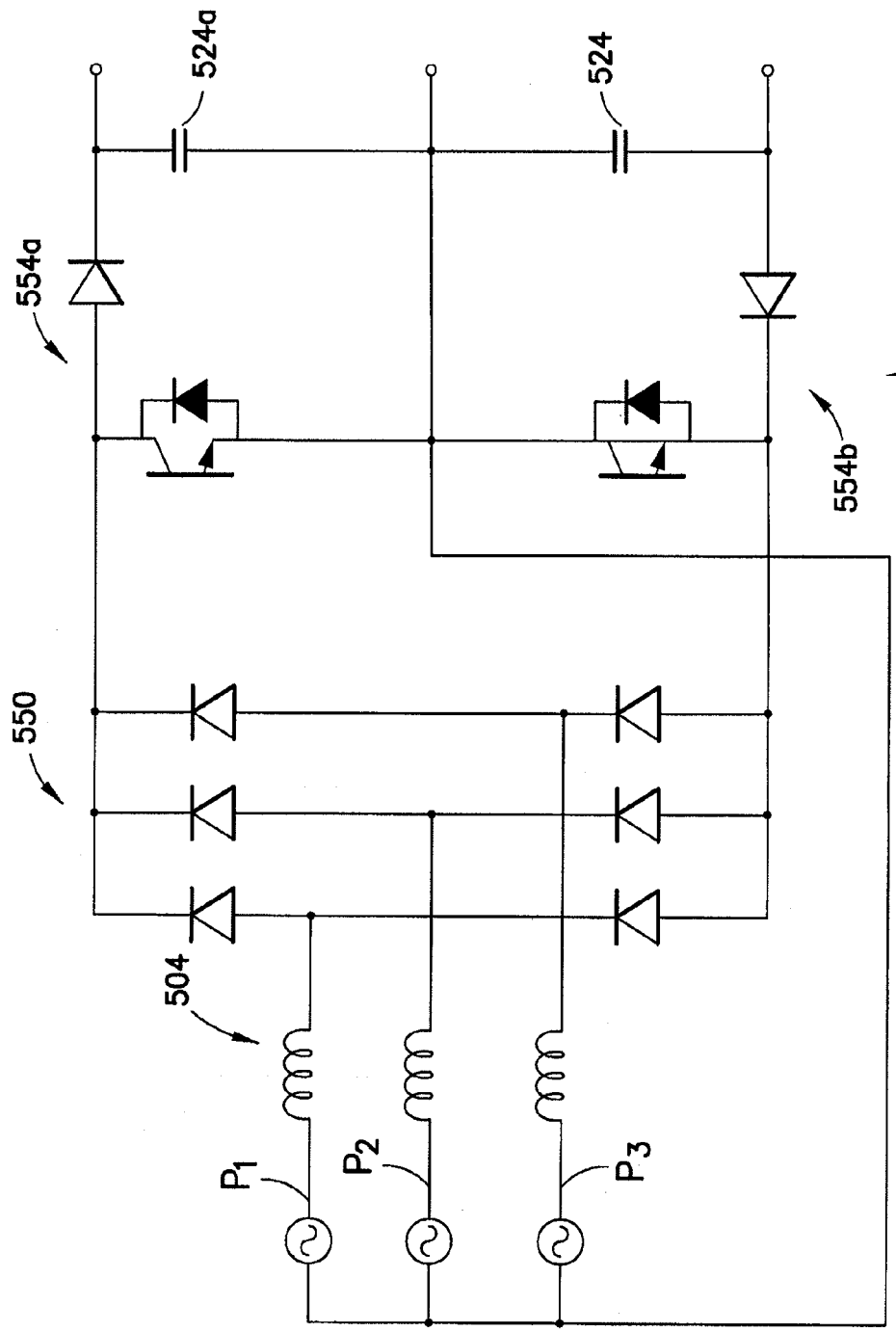
FIG. 5 shows an alternative three-phase converter circuit in accordance with the prior art.

FIG. 1 shows the PWM signals 22a, b, which are fed to the control inputs 10a, b of the Top and Bot switches 516a-c and 518a-c from FIG. 4, against time t in ms. The PWM generator 16 (FIG. 3) that generates the signals is in this case operated with a constant clock frequency $f_T$, which is significantly above the operating frequency $f_B$, namely $f_T = X * f_B$, or period duration T. By means of the parallel connection according to the invention, Top switches 516a-c and Bot switches 518a-c are driven simultaneously by central lines 11a, b. According to the invention, the switch-on instants of the PWM signals 22a and 22b are offset by half the period duration T/2. The switched-on times $T_{on,a}$ and $T_{on,b}$ for the respective Top and Bot switches have the same magnitude. If it is assumed that the period duration T corresponds to an angle range of 360°, the switched-on time $T_{on,a}$ of the Top switches lies in the range of from about 0° to about 40° and the switched-on time $T_{on,b}$ of the Bot switches lies in the range of about 180° to about 220°. The voltages $U_1$ and $U_2$ across the two capacitors of the intermediate circuit 20 or 508 are therefore opposite and equal in magnitude.

As a result of the phase offset of the switched-on times in accordance with FIG. 1, the frequency of the ripple of the output voltage Ua is greater than that of the individual voltages $U_1$ and $U_2$ with respect to the center potential at the center connection 526.

Figure 2:
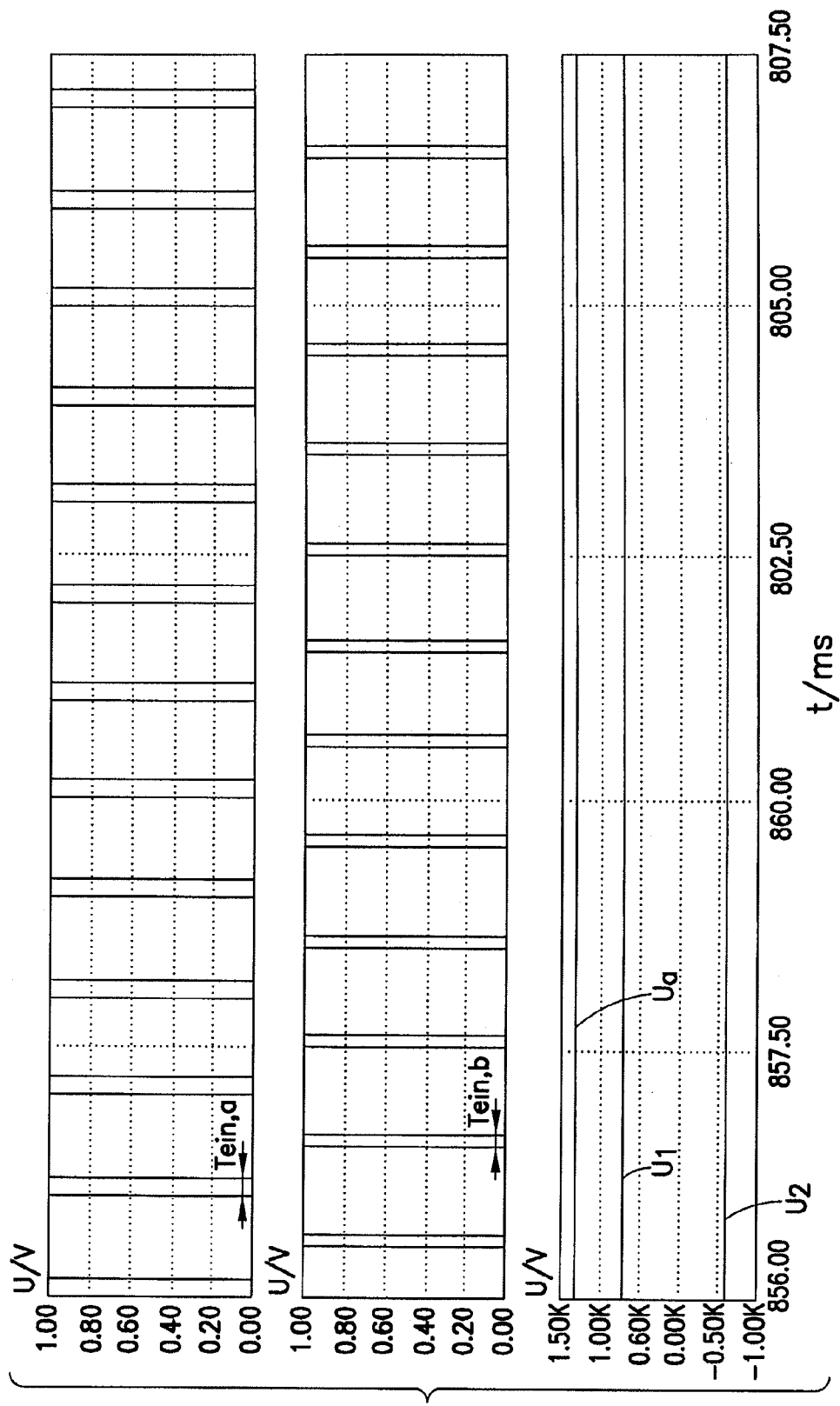
FIG. 2 shows the temporal profile of the PWM drive signals and of the generated voltages in the case of asymmetrical driving.

FIG. 2 shows the PWM signals 22a, b in the case of alternative driving of converter circuit 500, in the case of which—for the above 360° consideration—the switched-on interval $T_{on,a}$ of the Top switches with 0 to 60° is greater than the switched-on interval $T_{on,b}$ of the Bot switches of 180° to 220°. On account of the longer PWM pulses at the top switches, the latter are in the conducting state for longer, the boost caused by them is increased, and the voltage $U_1$ is therefore greater in magnitude than the voltage $U_2$. The center voltage at the center connection 526 is therefore not symmetrical or at half of the output voltage $U_A$.

FIG. 3 shows a converter circuit 2 which corresponds to the known converter circuit from FIG. 4 in accordance with the prior art, but has been adapted for a generator 4 having five phases $P_1$ to $P_5$. The inverter 6 therefore contains five half-bridges 8 with their center connections 9.

The respective control inputs 10a of Top switches 12a and the respective control inputs 10b of Bot switches 12b are again connected in parallel via its respective control line 11a, b and passed to a respective common control output 14a, b of the PWM circuit 16.

Moreover, the generator 4 does not have a center connection, which would be connected to the center connection of the intermediate circuit 20; the capacitors 19 are therefore only connected via a center connection 18 that is not connected to the generator.

The driving of the five-phase boost circuit 2 is effected identically to the above driving of the three-phase circuit with the same effects. A scaling of the number of phases is therefore easily possible with the inventive method. Polyphase systems with any desired number of phases above three can therefore easily be utilized.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for operating a converter circuit with voltage boosting having N half-bridges, which in each case can be connected by their center connection to a phase of an N-phase generator and at an end side are connected in parallel with a series circuit formed by two capacitances wherein each half-bridge contains a Top switch and a Bot switch, in which, in a PWM method with a fixed period duration:
    simultaneously switching on all the TOP switches for the duration of a TOP switched-on interval at the beginning of the fixed period duration,
    simultaneously switching on all the BOT switches for the duration of a BOT switched-on interval after half the fixed period duration,
    wherein the TOP switched-on interval, and the BOT switched-on interval amount at most to half the fixed period duration.

2. The method of claim 1, in which the TOP switched-on interval and the BOT switched-on interval have different lengths.

3. The method of claim 2, wherein the N-phase generator has an operating frequency, in which approximately a value equal to plurally tenfold multiplication of the reciprocal value of the operating frequency is chosen as the period duration.

4. The method of claim 3, wherein K converter circuits having capacitors are connected in parallel at their capacitors, further comprising the step of switching on the Top switches and the Bot switches of the respective converter circuit with a time offset of ½ K times the fixed period duration.

5. The method of claim 4, in which each of the capacitances is charged to a voltage of more than half the peak voltage of the generator.

6. The method of claim 3, in which each of the capacitances is charged to a voltage of more than half the peak voltage of the generator.

7. The method of claim 2, wherein K converter circuits having capacitors are connected in parallel at their capacitors, further comprising the step of switching on the Top switches and the Bot switches of the respective converter circuit with a time offset of ½ K times the fixed period duration.

8. The method of claim 7, in which each of the capacitances is charged to a voltage of more than half the peak voltage of the generator.

9. The method of claim 2, in which each of the capacitances is charged to a voltage of more than half the peak voltage of the generator.

10. The method of claim 1, wherein the N-phase generator has an operating frequency, in which approximately a value equal to plurally tenfold multiplication of the reciprocal value of the operating frequency is chosen as the period duration.

11. The method of claim 10, wherein K converter circuits having capacitors are connected in parallel at their capacitors, further comprising the step of switching on the Top switches and the Bot switches of the respective converter circuit with a time offset of ½ K times the fixed period duration.

12. The method of claim 11, in which each of the capacitances is charged to a voltage of more than half the peak voltage of the generator.

13. The method of claim 10, in which each of the capacitances is charged to a voltage of more than half the peak voltage of the generator.

14. The method of claim 1, wherein K converter circuits having capacitors are connected in parallel at their capacitors, further comprising the step of switching on the Top switches and the Bot switches of the respective converter circuit with a time offset of ½ K times the fixed period duration.

15. The method of claim 14, in which each of the capacitances is charged to a voltage of more than half the peak voltage of the generator.

16. The method of claim 1, in which each of the capacitances is charged to a voltage of more than half the peak voltage of the generator.

* * * * *